US011316400B2

(12) United States Patent
Byeon

(10) Patent No.: US 11,316,400 B2
(45) Date of Patent: Apr. 26, 2022

(54) MOTOR

(71) Applicant: LG INNOTEK CO., LTD., Seoul (KR)

(72) Inventor: Dae Gil Byeon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 55 days.

(21) Appl. No.: 16/755,320

(22) PCT Filed: Oct. 11, 2018

(86) PCT No.: PCT/KR2018/011945
§ 371 (c)(1),
(2) Date: Apr. 10, 2020

(87) PCT Pub. No.: WO2019/074290
PCT Pub. Date: Apr. 18, 2019

(65) Prior Publication Data
US 2021/0203205 A1     Jul. 1, 2021

(30) Foreign Application Priority Data

Oct. 11, 2017    (KR) ..................... 10-2017-0130200
Oct. 11, 2017    (KR) ..................... 10-2017-0130201

(51) Int. Cl.
*H02K 5/173*     (2006.01)
*H02K 1/2706*    (2022.01)
(Continued)

(52) U.S. Cl.
CPC ......... *H02K 5/1732* (2013.01); *H02K 1/2706* (2013.01); *H02K 1/28* (2013.01); *H02K 3/32* (2013.01); *H02K 5/10* (2013.01)

(58) Field of Classification Search
CPC .... H02K 5/1732; H02K 5/173; H02K 1/2703; H02K 1/28; H02K 3/32; H02K 5/10
(Continued)

(56) References Cited

U.S. PATENT DOCUMENTS 4,949,000 A     8/1990   Petersen
5,831,358 A *   11/1998   Bobay .................... H02K 29/10
                                                                      310/58
(Continued)

FOREIGN PATENT DOCUMENTS

CN            103051144 A     4/2013
DE    10-2011-089388 A1     6/2013
(Continued)

OTHER PUBLICATIONS

International Search Report in International Application No. PCT/KR2018/011945, filed Oct. 11, 2018.
(Continued)

*Primary Examiner* — Terrance L Kenerly
(74) *Attorney, Agent, or Firm* — Saliwanchik, Lloyd & Eisenschenk

(57) ABSTRACT

The present invention may provide a motor comprising: a shaft; a rotor coupled to the shaft; and a stator disposed outside the rotor, wherein the rotor comprises: a bearing holder including a cylindrical portion and a flange portion; a first bearing and a second bearing which are arranged on the cylindrical portion; a rotor core including a hole coupled to the cylindrical portion; and a magnet coupled to the rotor core, wherein the rotor core includes a pocket portion, the magnet is disposed in the pocket portion, the flange portion is disposed on the rotor core and the magnet, and the cylindrical portion includes a first region on which the first bearing is disposed and a second region on which the second bearing is disposed, wherein the first region and the second region of the cylindrical portion are inserted into the hole of the rotor core.

11 Claims, 22 Drawing Sheets

(51) Int. Cl.
*H02K 1/28* (2006.01)
*H02K 3/32* (2006.01)
*H02K 5/10* (2006.01)

(58) Field of Classification Search
USPC .................................................. 310/156.01
See application file for complete search history.

(56) References Cited

U.S. PATENT DOCUMENTS

2007/0286753 A1   12/2007   Ihle et al.
2015/0084468 A1*  3/2015   Nigo ..................... H02K 1/276
                                                         310/156.53

FOREIGN PATENT DOCUMENTS

| DE | 10-2015-217702 A1 | 3/2016 | | |
|---|---|---|---|---|
| EP | 3 001 037 A1 | 3/2016 | | |
| FR | 2811034 | * | 1/2002 | ............... H02K 7/14 |
| JP | 2013-160079 A | 8/2013 | | |
| JP | 2016-189687 A | 11/2016 | | |

OTHER PUBLICATIONS

Supplementary Partial European Search Report dated Jun. 1, 2021 in European Application No. 18866712.5.

* cited by examiner

FIG. 3
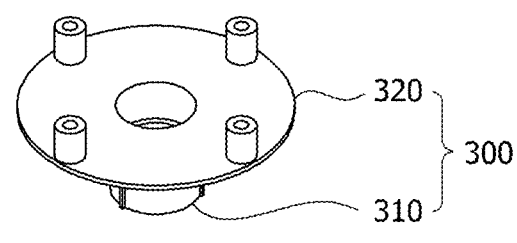
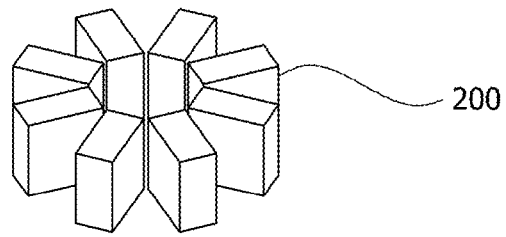
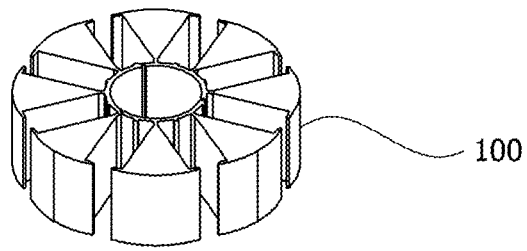
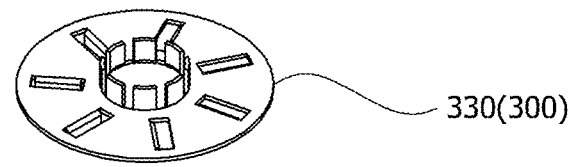

FIG. 10
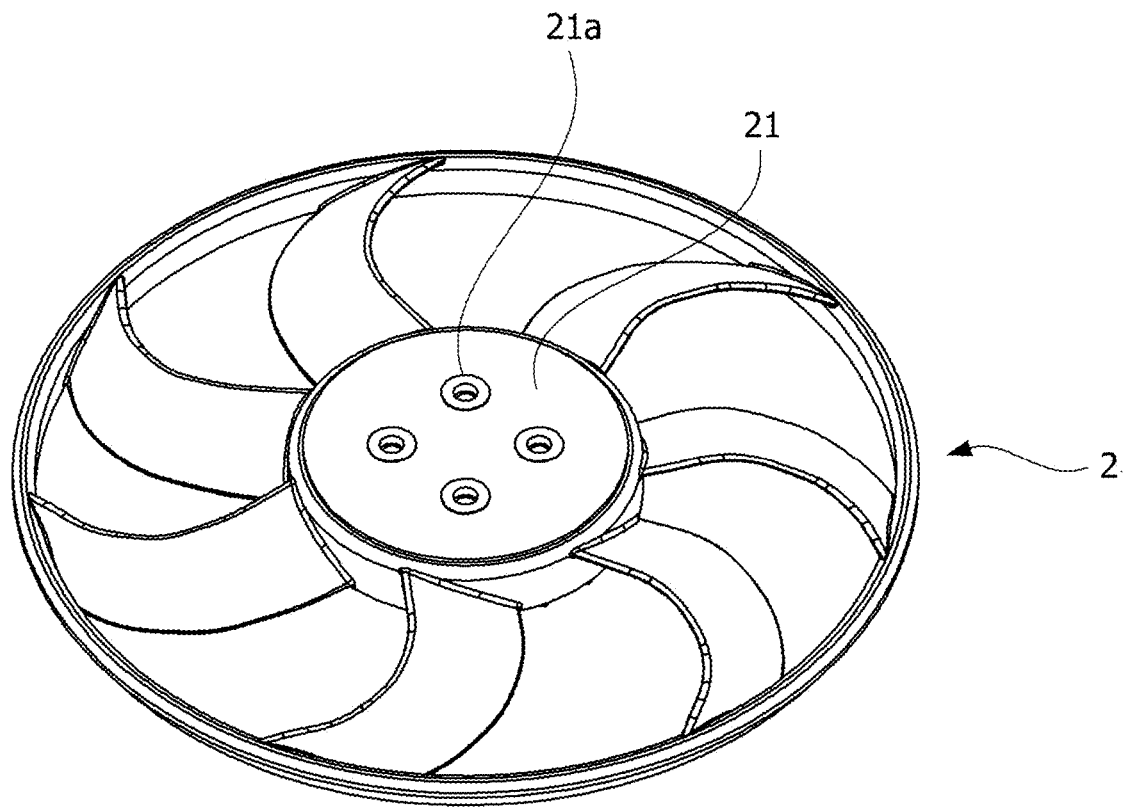
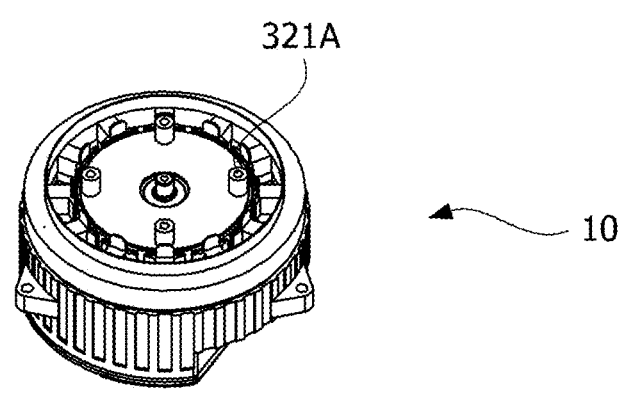

MOTOR

CROSS-REFERENCE TO RELATED APPLICATIONS

This application is the U.S. national stage application of International Patent Application No. PCT/KR2018/011945, filed Oct. 11, 2018, which claims the benefit under 35 U.S.C. § 119 of Korean Application Nos. 10-2017-0130200, filed Oct. 11, 2017; and 10-2017-0130201, filed Oct. 11, 2017; the disclosures of each of which are incorporated herein by reference in their entirety.

TECHNICAL FIELD

An embodiment relates to a motor.

BACKGROUND ART

Vehicles have a high temperature in an engine and thus require a cooling device. As the cooling device, a radiator configured to cool a high-temperature refrigerant and a condenser configured to condense the refrigerant may be provided. In addition, a fan is provided for blowing air toward the radiator or the condenser. The fan may be driven by a motor.

The motor includes a rotor and a stator. A plurality of magnets may be arranged in the rotor. Pockets may be provided in a rotor core and the magnets may be inserted into the pockets. An adhesive is used to fix the magnet to the pocket. The adhesive may be applied to the pocket, and the bonding force between the pocket and the magnet may be decreased due to the non-uniform application of the adhesive during the application process or the gap between the pocket and the magnet. As a result, there is a great risk of the magnet being separated from the rotor in a high-temperature narrow space in which the engine is disposed.

The motor may also include a housing configured to accommodate the rotor and the stator. The housing serves to physically fix the stator and at the same time to isolate and protect the rotor and the stator from the external space. Such a housing is a very disadvantageous configuration under high-temperature conditions, in which the engine is disposed, in dissipating heat generated by the rotor, the stator, or a printed circuit board. In addition, the housing is heavy in weight and difficult to form.

DISCLOSURE

Technical Problem

An embodiment is directed to providing a motor in which a magnet is inhibited from being separated from a pocket of a rotor core.

In particular, an embodiment is also directed to providing a motor in which the use of an adhesive is reduced and a magnet is inhibited from being separated from a pocket of a rotor core under a high-temperature condition.

Further, an embodiment is also directed to providing a motor in which heat is easily dissipated under a high-temperature condition.

Further, an embodiment is also directed to providing a motor whose weight may be reduced.

Objectives to be achieved by an embodiment of the present invention are not limited to the above-described objectives, and other objectives, which are not described above, may be clearly understood by those skilled in the art through the following specification.

Technical Solution

One aspect of the present invention provides a rotor including a bearing holder including a cylinder portion and a flange portion, a first bearing and a second bearing disposed in the cylinder portion, a rotor core including a hole coupled to the cylinder portion, and a magnet coupled to the rotor core, wherein the rotor core includes a pocket portion, the magnet is disposed in the pocket portion, the flange portion is disposed on the rotor core and the magnet, the cylinder portion includes a first region in which the first bearing is disposed and a second region in which the second bearing is disposed, and the first region and the second region of the cylinder portion are inserted into the hole of the rotor core.

The bearing holder may include a first step in contact with the first bearing and a second step in contact with the second bearing.

The bearing holder may include a groove formed in the second region and a plate coupled to the groove and disposed on a lower surface of the rotor core.

The plate may include a protruding portion protruding downward and extending in a radial direction.

A lower surface of the plate may include a sealant disposed in a circumferential direction.

A side surface of the magnet may be in contact with the rotor core without an adhesive.

An outer diameter of the flange portion may be within 65% to 95% of an outer diameter of the rotor core.

The rotor core may include a hub having an annular shape and teeth radially arranged in the hub, a guide groove may be disposed on an inner circumferential surface of the hub, and a guide protrusion inserted into the guide groove may be disposed on an outer circumferential surface of the cylinder portion.

An outer circumferential surface of the hub may include a protrusion protruding toward the pocket portion.

Another aspect of the present invention provides a rotor including a bearing holder including a cylinder portion and a flange portion, a first bearing disposed on one side of the cylinder portion, a second bearing disposed on the other side of the cylinder portion, a rotor core including a hole coupled to the cylinder portion, a magnet coupled to the rotor core, and a plate disposed below the rotor core, wherein the rotor core includes a pocket portion in which the magnet is disposed, the flange portion is disposed on the rotor core, and the plate is coupled to the other side of the cylinder portion.

Still another aspect of the present invention provides a motor including a shaft, a rotor coupled to the shaft, and a stator disposed outside the rotor, wherein the rotor includes a bearing holder including a cylinder portion and a flange portion, a first bearing and a second bearing disposed in the cylinder portion, a rotor core including a hole coupled to the cylinder portion, and a magnet coupled to the rotor core, wherein the rotor core includes a pocket portion, the magnet is disposed in the pocket portion, the flange portion is disposed on the rotor core and the magnet, and the cylinder portion includes a first region in which the first bearing is disposed and a second region in which the second bearing is disposed, wherein the first region and the second region of the cylinder portion are inserted into the hole of the rotor core.

Yet another aspect of the present invention provides a motor including a shaft, a rotor coupled to the shaft, a stator disposed outside the rotor, and a first cover having a cylindrical shape and disposed outside the stator, wherein an outer circumferential surface of the stator includes a first region and a second region, wherein the first region is disposed to be in contact with an inner circumferential surface of the first cover, and the second region is disposed above the first cover.

A step in contact with a lower surface of the stator may be disposed on the inner circumferential surface of the first cover.

The stator may include an insulator, and the insulator may cover the second region.

The insulator may include an upper insulator and a lower insulator, an outer diameter of the upper insulator may be greater than an inner diameter of the first cover and less than an outer diameter of the first cover, and an outer diameter of the lower insulator may be less than the inner diameter of the first cover.

The insulator may include an upper insulator and a lower insulator, the upper insulator may include an upper body having an annular shape and a plurality of upper side coil winding parts extending inwardly from the upper body, the upper body may include an upper surface portion and a first outer side surface portion extending downward from the upper surface portion, and an inner circumferential surface of the first outer side surface portion may be in contact with the second region.

A lower surface of the first outer side surface portion and an upper surface of the first cover may be disposed to be spaced apart from each other.

The insulator may include an upper insulator and a lower insulator, the lower insulator may include a lower body having an annular shape and a plurality of lower side coil winding parts extending inwardly from the lower body, and the lower body may include a terminal groove in which a busbar terminal is accommodated.

The lower body may include a lower surface portion and a second outer side surface portion extending upward from the lower surface portion, and an upper surface of the second outer side surface portion may be in contact with the lower surface of the stator.

The lower body may include a lower surface portion and a second outer side surface portion extending upward from the lower surface portion, and a connection terminal of the busbar terminal may be disposed to protrude from the lower surface portion so as to be exposed.

A groove portion disposed from a lower end to an upper end of the stator and disposed on an outer circumferential surface of the stator to be recessed in a radial direction of the stator may be included.

The shaft may be coupled to the first cover.

Advantageous Effects

According to an embodiment, provided is an advantageous effect of inhibiting a magnet from being separated from a pocket of a rotor core.

According to an embodiment, provided is an advantageous effect of inhibiting a magnet from being separated from a pocket of a rotor core under a high-temperature condition.

According to an embodiment, provided is an advantageous effect of facilitating heat dissipation.

According to an embodiment, provided is an advantageous effect of reducing the weight of a product.

DESCRIPTION OF DRAWINGS

FIG. 3 is an exploded perspective view of a rotor in FIG. 1.

FIG. 10 is a view illustrating the motor and a fan shown in FIG. 1.

MODES OF THE INVENTION

Hereinafter, an exemplary embodiment of the present invention will be described in detail with reference to the drawings.

However, the technical spirit of the present invention is not limited to some embodiments which will be described herein and may be realized using various other embodiments, and at least one element of the embodiments may be selectively coupled, substituted, and used to realize the technical spirit within the range of the technical spirit.

Further, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

Further, the terms used in the embodiment of the present invention are provided only to describe embodiments of the present invention and not for limiting the present invention.

In the present specification, the singular forms include the plural forms unless the context clearly indicates otherwise, and the phrase "at least one element (or one or more elements) of an element A, an element B, and an element C" should be understood as including the meaning of at least one of all combinations being obtained by combining the element A, the element B, and the element C.

Further, in describing elements of the embodiment of the present invention, the terms such as first, second, A, B, (a), (b), and the like may be used.

These terms are merely for distinguishing one element from other elements, and the essential, order, sequence, and the like of corresponding elements are not limited by the terms.

In addition, when an element is referred to as being "connected or coupled" to another element, such a description may include both a case in which the element is directly connected or coupled to another element, and a case in which the element is connected or coupled to another element with still another element disposed therebetween.

Further, when an element is described as being formed or disposed "on (above)" or "under (below)" another element, the term "on (above)" or "under (below)" includes both a case in which two elements are in direct contact with each other or a case in which one or more elements are (indirectly) disposed between two elements. In addition, when an element is described as being disposed "on or under" another element, such a description may include a case in which the element is disposed at an upper side or a lower side with respect to another element.

Figure 1:
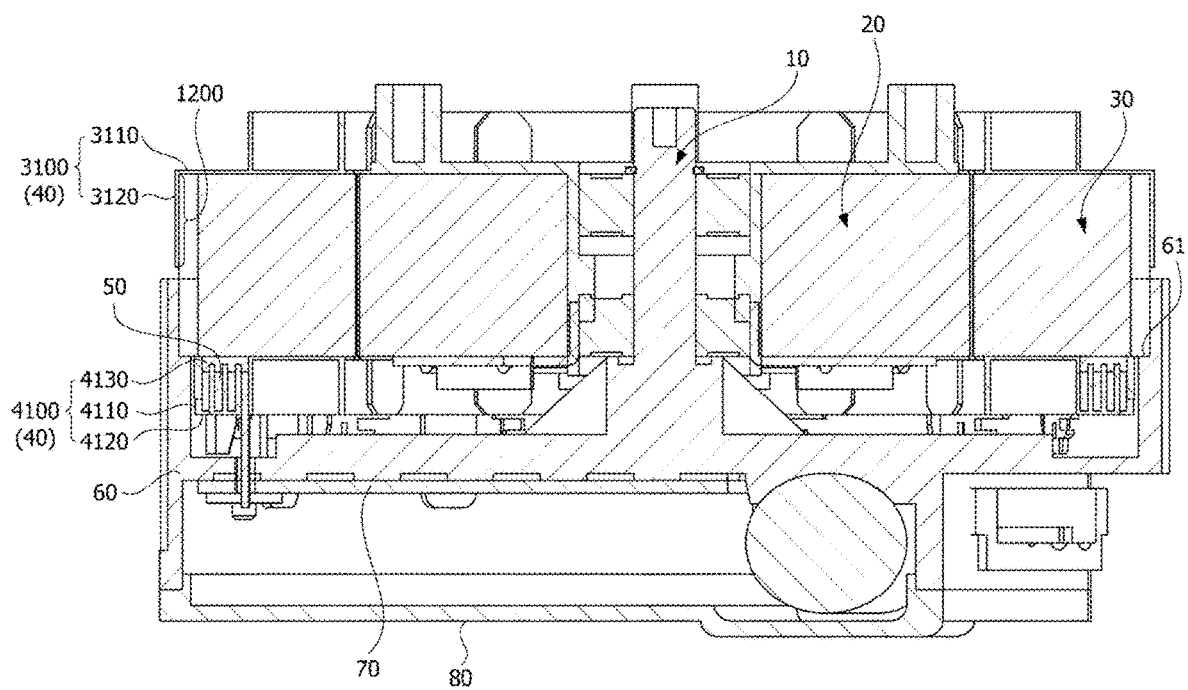
FIG. 1 is a side cross-sectional view of a motor according to an embodiment.
Figure 2:
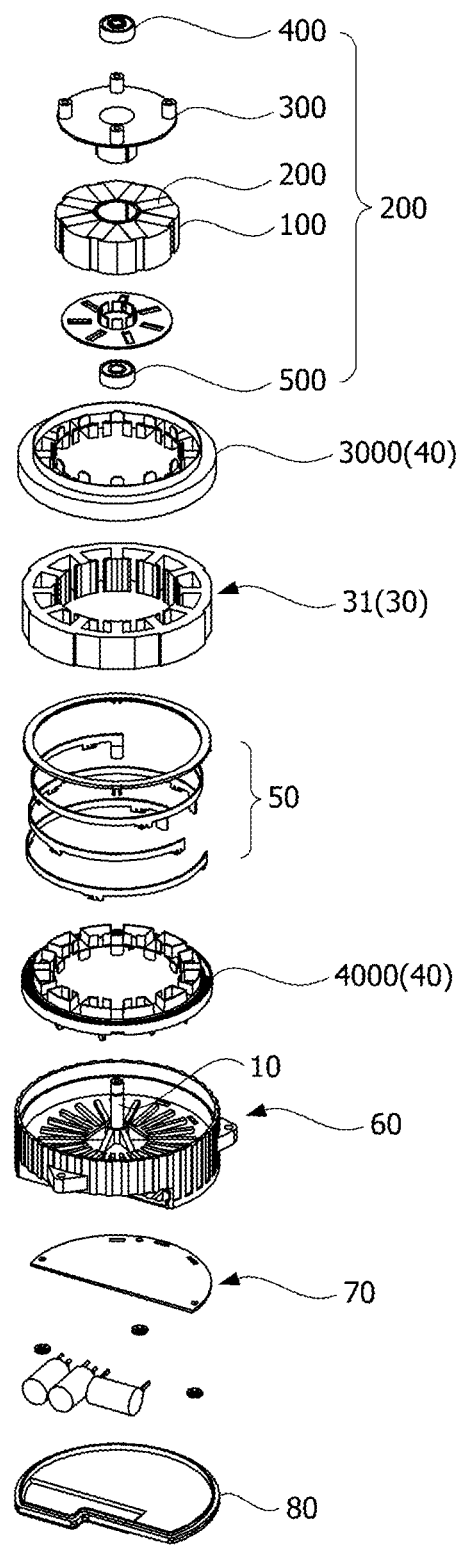
FIG. 2 is an exploded perspective view of the motor shown in FIG. 1.

FIG. 1 is a side cross-sectional view of a motor according to an embodiment, and FIG. 2 is an exploded perspective view of the motor shown in FIG. 1.

Referring to FIGS. 1 and 2, a motor 1 according to the embodiment may include a shaft 10, a rotor 20, a stator 30, an insulator 40, a busbar terminal 50, a first cover 60, a printed circuit board 70, and a second cover 80.

The shaft 10 is an axis of the rotor 20 that rotates. The shaft 10 may be fixed without rotating. The shaft 10 may be coupled to the first cover 60. Alternatively, the shaft 10 may be integrally formed with the first cover 60.

The rotor 20 is rotatably coupled to the shaft 10. In addition, the rotor 20 may be disposed inside the stator 30. The rotor 20 rotates through an electrical interaction with the stator 30.

A coil may be wound around the stator 30 to induce the electrical interaction between the stator 30 and the rotor 20. A specific configuration of the stator 30 is provided as follows. The stator 30 may include a stator core 31 having a plurality of teeth. The stator core 31 may be provided with a yoke portion having an annular shape and the teeth around which a coil is wound in a center direction from the yoke portion. The teeth may be provided at regular intervals along an outer circumferential surface of the yoke portion. Meanwhile, the stator core 31 may be formed by stacking a plurality of plates having a thin steel sheet shape. Further, the stator core 31 may be formed by coupling or connecting a plurality of divided cores to each other.

The insulator 40 may be mounted on the stator core 31. The insulator 40 serves to insulate the stator core 31 from the coil. The insulator 40 may be disposed above the stator core 31.

The busbar terminal 50 may be mounted on the insulator 40. The busbar terminal 50 is electrically connected to the coil of the stator 30.

The first cover 60 is disposed below the stator 30. The first cover 60 may be a cylindrical-shaped member having an open upper portion. The first cover 60 may be disposed to partially surround a lower side of the stator 30.

The printed circuit board 70 may be disposed on a lower surface of the first cover 60. Various electronic devices including an inverter for supplying power may be disposed on the printed circuit board 70.

The second cover 80 may be disposed on the lower surface of the first cover 60. The second cover 80 is coupled to the first cover 60 to accommodate the printed circuit board 70 in a space therebetween. The second cover 80 protects the printed circuit board 70 by covering the printed circuit board 70. A connector (not shown) electrically connected to the printed circuit board 70 may be disposed on the second cover 80.

FIG. 3 is an exploded perspective view of the rotor in FIG. 1.

Referring to FIG. 3, the rotor 20 may include a rotor core 100, a magnet 200, a bearing holder 300, a first bearing 400, and a second bearing 500. Here, the first bearing 400 and the second bearing 500 are accommodated in the bearing holder 300. The first bearing 400 may be disposed relatively further upward than the second bearing 500.

Figure 4:
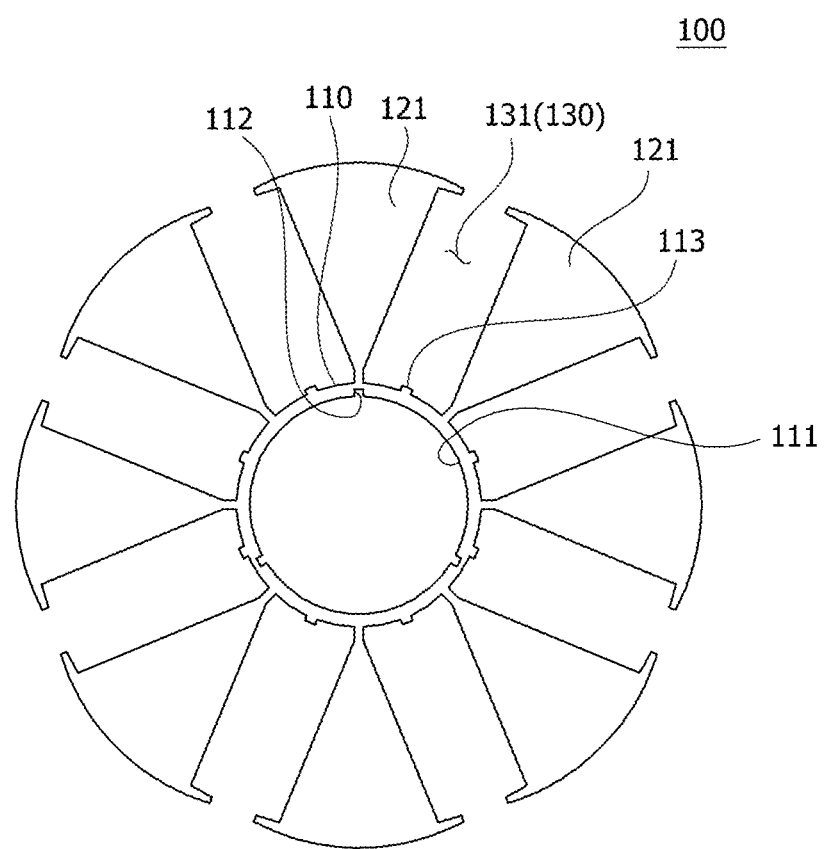
FIG. 4 is a view illustrating a rotor core shown in FIG. 3.
Figure 5:
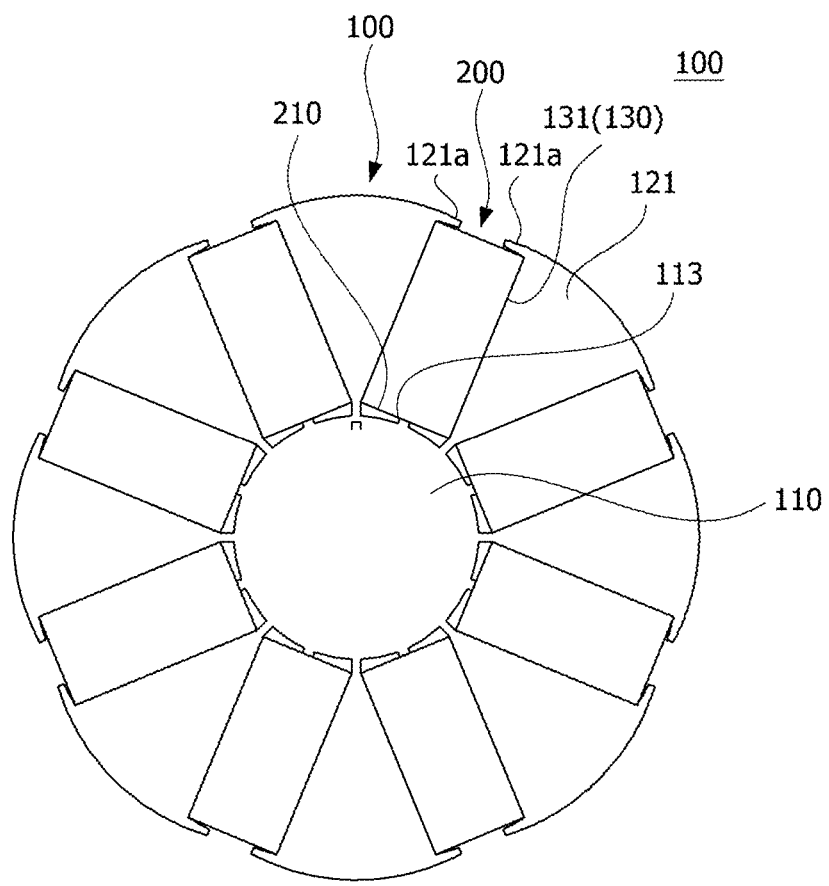
FIG. 5 is a view illustrating the rotor core in which magnets are disposed.

FIG. 4 is a view illustrating the rotor core shown in FIG. 3, and FIG. 5 is a view illustrating the rotor core in which the magnets are disposed. The following descriptions will be made with reference to FIGS. 4 and 5.

The rotor core 100 may include a hub 110 and a tooth 121. A hole 111 is disposed at the center of the hub 110. The bearing holder 300 is coupled to the hole 111. A guide groove 112 is disposed on an inner circumferential surface of the hub 110. The guide groove 112 may be disposed on the inner circumferential surface of the hub 110 to be recessed in a radial direction of the rotor core 100. The guide groove 112 serves to guide the bearing holder 300 when the bearing holder 300 is inserted into the hole 111. In addition, a plurality of protrusions 113 may be disposed on an outer circumferential surface of the hub 110. The protrusions 113 may protrude from the outer circumferential surface of the hub 110. The protrusions 113 serve to support an inner surface 210 of the magnet 200 mounted in a pocket 131. A plurality of teeth 121 are radially arranged on the hub 110. In addition, the plurality of teeth 121 are arranged along a circumference of the hub 110 at regular intervals.

The rotor core 100 includes a pocket portion 130. The pocket portion 130 includes a plurality of pockets 131. Here, the pocket 131 is defined as a separation space between the tooth 121 and the tooth 121. An inner side of the pocket 131 in the radial direction of the rotor core 100 is closed due to the hub 110 and an outer side of the pocket 131 in the radial direction of the rotor core 100 is open. The magnet 200 is disposed in the pocket 131. A planar shape of the pocket 131 may be rectangular. A protruding portion 121a may be disposed at an end of the tooth 121. The protruding portion 121a may protrude toward the pocket 131 from a side surface of the end of the tooth 121. The protruding portion 121a serves to inhibit the magnet 200 disposed in the pocket 131 from being separated from the pocket 131 in the radial direction of the rotor core 100. Meanwhile, the rotor core 100 may be formed by stacking a plurality of plates having a circular thin steel sheet shape.

The magnet 200 may be disposed in the pocket 131 such that long sides thereof are disposed in the radial direction of the rotor core 100 in a cross-sectional view. Such an arrangement of the magnet 200 may increase the arrangement density of the magnet 200, thereby increasing the performance of the motor. The pocket 131 includes open upper and lower sides. Accordingly, the magnet 200 may be separated from the pocket 131 in an axial direction of the rotor core 100. In order to inhibit this, the bearing holder 300 is provided.

Figure 6:
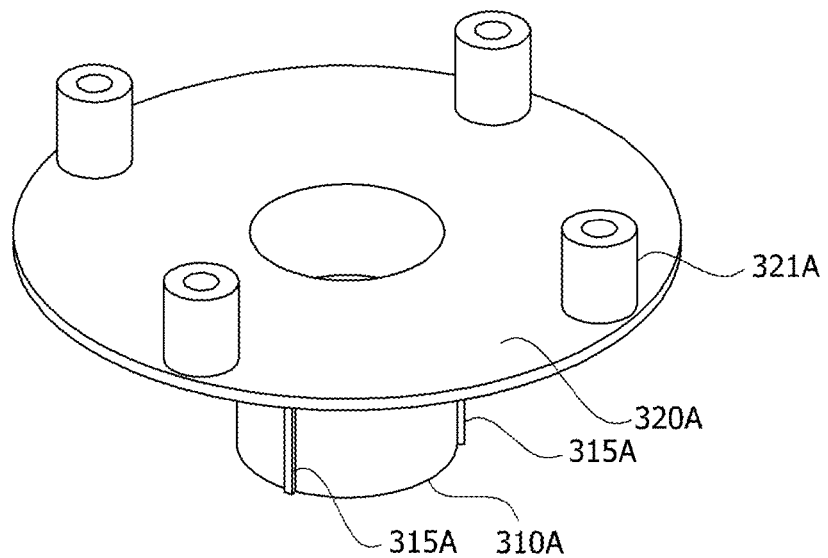
FIG. 6 is a view illustrating a cylinder portion and a flange portion of a bearing holder shown in FIG. 3.

FIG. 6 is a view illustrating a cylinder portion and a flange portion of the bearing holder shown in FIG. 3.

A bearing holder 300A inhibits the magnet 200 from being separated from the pocket 131 (in FIG. 4) toward an upper side of the rotor core 100. In addition, the bearing holder 300A serves to fix the first bearing 400 and the second bearing 500. The bearing holder 300A may include a cylinder portion 310A and a flange portion 320A.

An accommodation space for accommodating the first bearing 400 and the second bearing 500 is formed inside the cylinder portion 310A.

The flange portion 320A may have a disc shape. The flange portion 320A may be disposed to extend in a radial direction of the cylinder portion 310A from an upper end of the cylinder portion 310A. A lower surface of the flange portion 320A is disposed on an upper surface of the rotor core 100 to inhibit the magnet 200 (in FIG. 5) from being separated from the pocket 131 (in FIG. 5) toward the upper side of the rotor core 100. The lower surface of the flange portion 320A may be in contact with the upper surface of the rotor core 100. A fastening portion 321A protrudes from an upper surface of the flange portion 320A. The fastening portion 321A is coupled to the fan. A plurality of fastening portions 321A may be provided.

Figure 7:
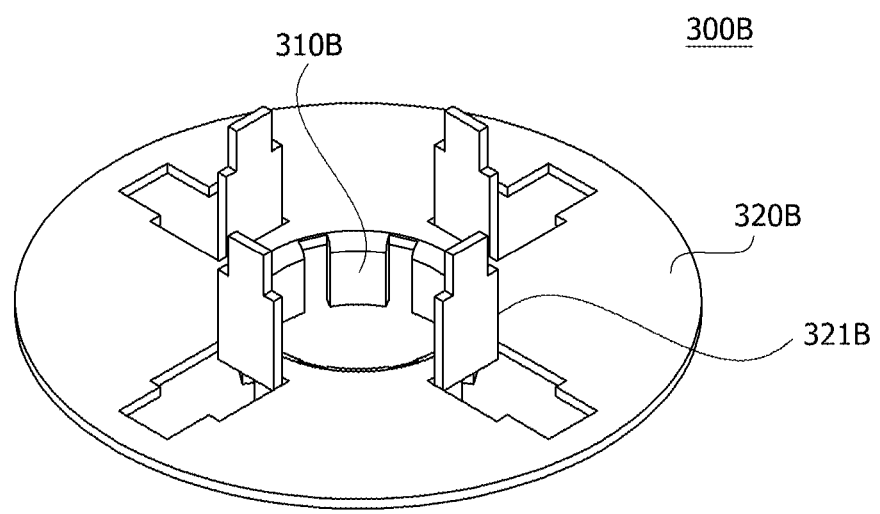
FIG. 7 is a view illustrating a cylinder portion and a flange portion of a bearing holder according to a modified example.

FIG. 7 is a view illustrating a cylinder portion and a flange portion of a bearing holder according to a modified example.

A bearing holder 300B inhibits the magnet 200 from being separated from the pocket 131 (in FIG. 4) toward the upper side of the rotor core 100. In addition, the bearing holder 300B serves to fix only the first bearing 400 among the first bearing 400 and the second bearing 500. The second bearing 500 is fixed by a guide 333 of a plate 330 in FIG. 8. The bearing holder 300B may include a cylinder portion 310B and a flange portion 320B.

An accommodation space for accommodating the first bearing 400 is formed inside the cylinder portion 310B. The cylinder portion 310B may be formed of a plurality of fragments. The flange portion 320B may have a disc shape. A fastening portion 321B protrudes from an upper surface of the flange portion 320B. The fastening portion 321B may be a fragment in which a portion of the flange portion 320B is cut and bent upward. The cylinder portion 310B may be a fragment bent downward from the flange portion 320B. The fastening portion 321B is coupled to the fan.

Figure 8:
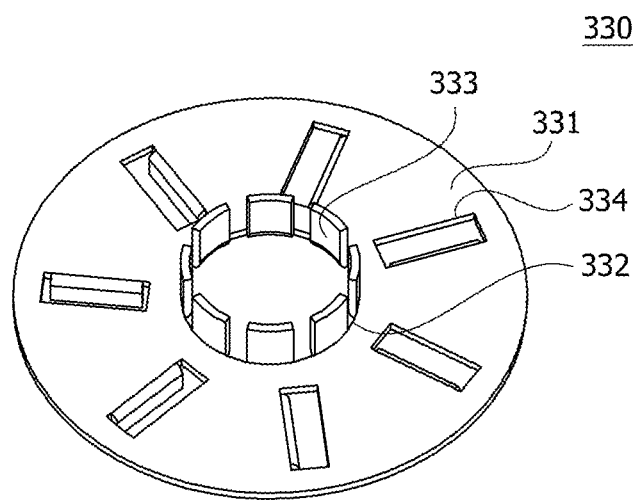
FIG. 8 is a view illustrating a plate of the bearing holder shown in FIG. 3.
Figure 9:
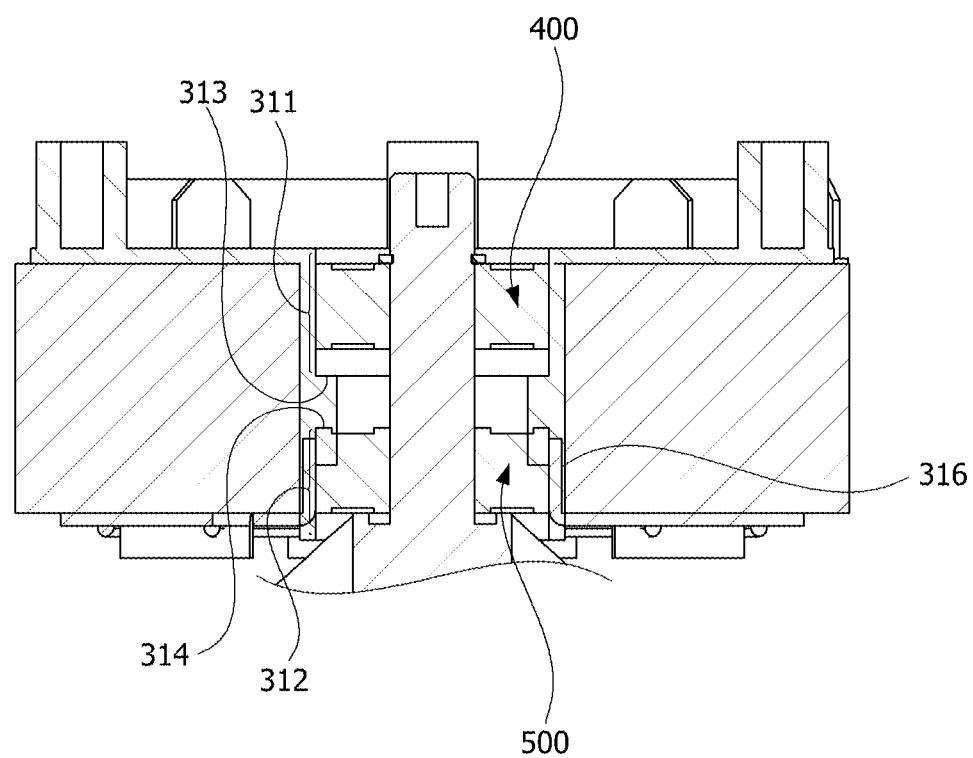
FIG. 9 is a side cross-sectional view of the bearing holder in which a first bearing and a second bearing are accommodated.

FIG. 8 is a view illustrating the plate, and FIG. 9 is a side cross-sectional view of the bearing holder in which the first bearing and the second bearing are accommodated.

Referring to FIG. 8, the plate 330 may be disposed on a lower surface of the rotor core 100. The plate 330 may include a base 331 having a disc shape. A hole 332 is disposed in a center of the base 331. A plurality of guides 333 may be arranged at regular intervals along a circumference of the hole 332. The guide 333 may be formed by being bent upward from an inner wall of the hole 332. When the plate 330 is coupled to a lower surface of a cylinder portion 310, the guide 333 may be press-fitted along a groove 316 of a second region 312 of the cylinder portion 310. Alternatively, the guide 333 may be directly press-fitted on an inner circumferential surface of the rotor core. The second bearing 500 is disposed inside the guide 333. An inner circumferential surface of the guide 333 is in contact with an outer circumferential surface of an outer ring of the second bearing 500. An upper surface of the plate 330 is disposed on the lower surface of the rotor core 100 to inhibit the magnet 200 from being separated from the pocket 131 toward a lower side of the rotor core 100.

Referring to FIGS. 8 and 9, the cylinder portion 310A may include a first region 311 and the second region 312. The first region 311 and the second region 312 are inserted into the hole 111 (in FIG. 4) of the rotor core 100 (in FIG. 4). The first bearing 400 may be disposed by being press-fitted into the first region 311. A first step 313 may be disposed in the first region 311. The first step 313 protrudes from an inner circumferential surface of the cylinder portion 310A and is in contact with a lower surface of the first bearing 400. In addition, the first step 313 serves to distinguish the first region 311 from the second region 312. The second bearing 500 may be disposed by being press-fitted into the second region 312. Meanwhile, a second step 314 may be disposed in the second region 312. The second step 314 protrudes from the inner circumferential surface of the cylinder portion 310A and is in contact with an upper surface of the second bearing 500. The second step 314 also serves to distinguish the first region 311 from the second region 312.

A guide protrusion 315A may be disposed on an outer circumferential surface of the cylinder portion 310A. The guide protrusion 315A is inserted into the guide groove 112 disposed on the inner circumferential surface of the hub 110 of the rotor core 100. The groove 316 may be disposed in the second region 312 of the cylinder portion 310A. The groove 316 is for coupling with the plate 330.

FIG. 10 is a view illustrating the motor and the fan shown in FIG. 1.

Referring to FIG. 10, the fastening portion 321 is coupled to a hub 21 of a fan 2. The hub 21 may be provided with coupling holes 21a to which the fastening portions 321 are coupled. The plurality of fastening portions 321 are arranged to be aligned with the coupling holes 21a of the hub 21.

Figure 11:
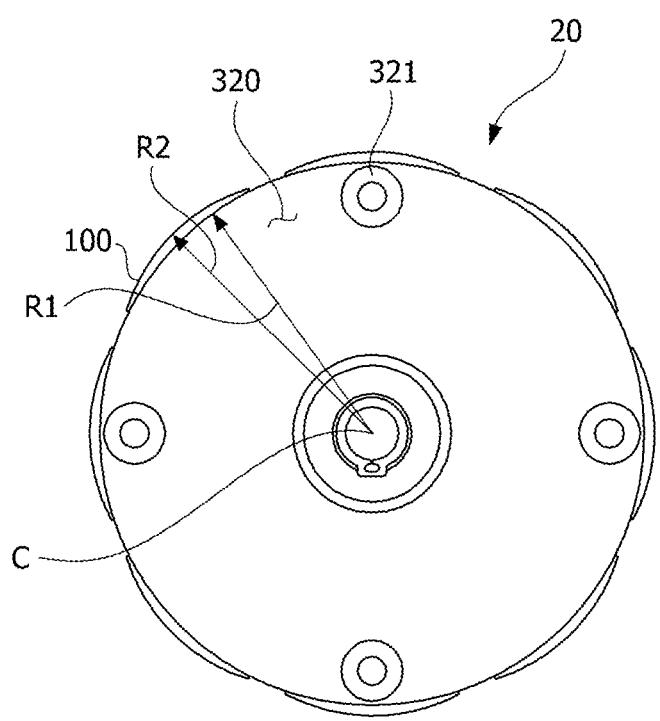
FIG. 11 is a view illustrating an upper surface of the rotor shown in FIG. 3.

FIG. 11 is a view illustrating an upper surface of the rotor shown in FIG. 3.

Referring to FIG. 11, an outer diameter R1 of the flange portion 320A is less than an outer diameter R2 of the rotor core 100 on the basis of a center C of the rotor 20. For example, the outer diameter R1 of the flange portion 320A may range from 65% to 95% of the outer diameter R2 of the rotor core 100. When the outer diameter R1 of the flange portion 320A is less than 65% of the outer diameter R2 of the rotor core 100, there is a great risk in that the magnet 200 may not be sufficiently inhibited from being separated from the pocket 131. In addition, there is a problem in that coupling safety with the fan 2 is poor because the fastening portion 321 is disposed too close to the center C of the bearing holder 300A. When the outer diameter RI of the flange portion 320A is greater than 95% of the outer diameter R2 of the rotor core 100, there is a problem in that dimensional management of the gap with the stator 30 is difficult. Meanwhile, here, the outer diameter R2 of the rotor core 100 refers to the longest distance from the center C of the rotor 20 to an outer circumferential surface of the rotor core 100.

Figure 12:
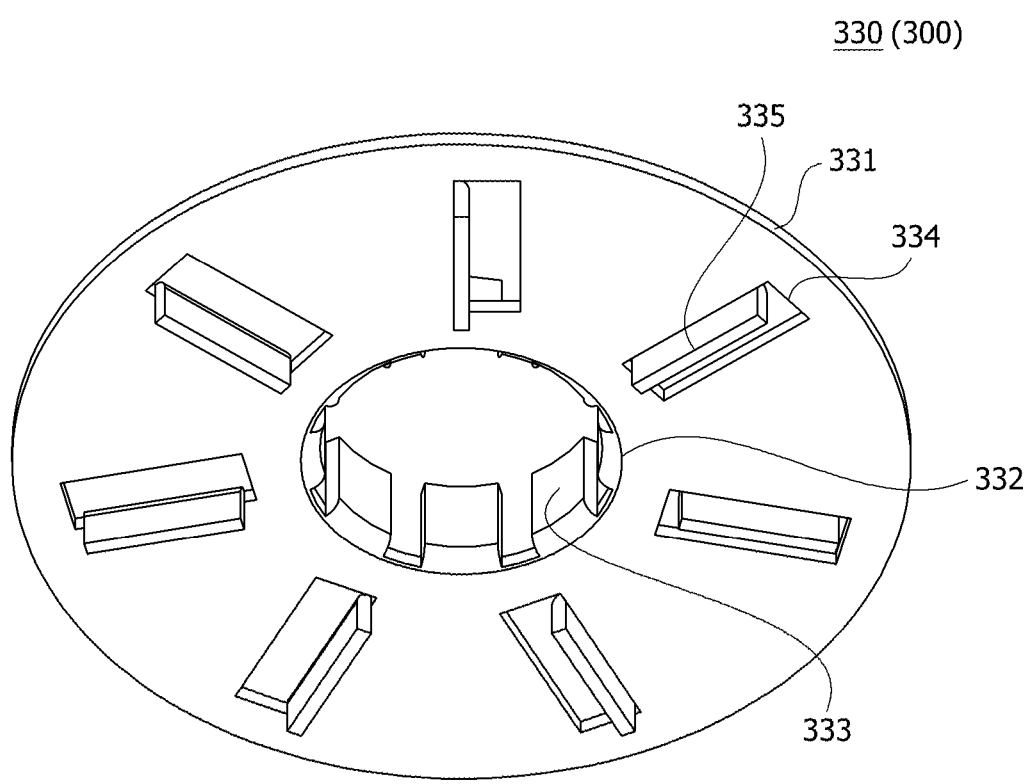
FIG. 12 is a perspective view of the plate shown in FIG. 8 viewed from below.

FIG. 12 is a perspective view of the plate shown in FIG. 8 viewed from below.

Referring to FIG. 12, the plate 330 may be disposed on the lower surface of the rotor core 100. The plate 330 may include the base 331 having a disc shape. The hole 332 is disposed in the center of the base 331. The plurality of guides 333 may be arranged at regular intervals along the circumference of the hole 332. The guide 333 may be formed by being bent upward from the inner wall of the hole 332. When the plate 330 is coupled to a lower surface of the cylinder portion 310A, the guide 333 may be press-fitted along the groove 316 of the second region 312 of the cylinder portion 310A. The second bearing 500 is disposed inside the guide 333. The inner circumferential surface of the guide 333 is in contact with the outer circumferential surface of the second bearing 500. The upper surface of the plate 330 is disposed on the lower surface of the rotor core 100 to inhibit the magnet 200 from being separated from the pocket 131 toward the lower side of the rotor core 100.

A lower surface of the plate 330 may be in contact with the upper surface of the rotor core 100. A through hole 334 having an elongated shape may be disposed in the base 331. A plurality of through holes 334 may be radially arranged around the hole 332. The through hole 334 may become a passage through which air introduced from the upper side of the rotor core 100 is discharged. Alternatively, the through hole 334 may become a passage through which air introduced from the lower side of the rotor core 100 enters. The plate 330 may include a protruding portion 335. The protruding portion 335 is disposed to protrude downward from the plate 330 and may be disposed to extend in a radial direction of the plate 330. For example, the protruding portion 335 may be formed by extending from a sidewall of the through hole 334 and being bent upward.

The printed circuit board 70 may be disposed on the lower surface of the first cover 60, and heat generated from the printed circuit board 70 may be transmitted toward the rotor 20 and the stator 30 through the first cover 60. In addition, heat is also generated in the coil of the stator 30. The protruding portion 335 serves to increase the contact area with air at a lower side of the plate 330, thereby cooling the hot air. In addition, the protruding portion 335 serves as a blade as the rotor core 100 rotates to cause air flow in the rotor core 100, thereby enhancing a heat dissipation effect.

Figure 13:
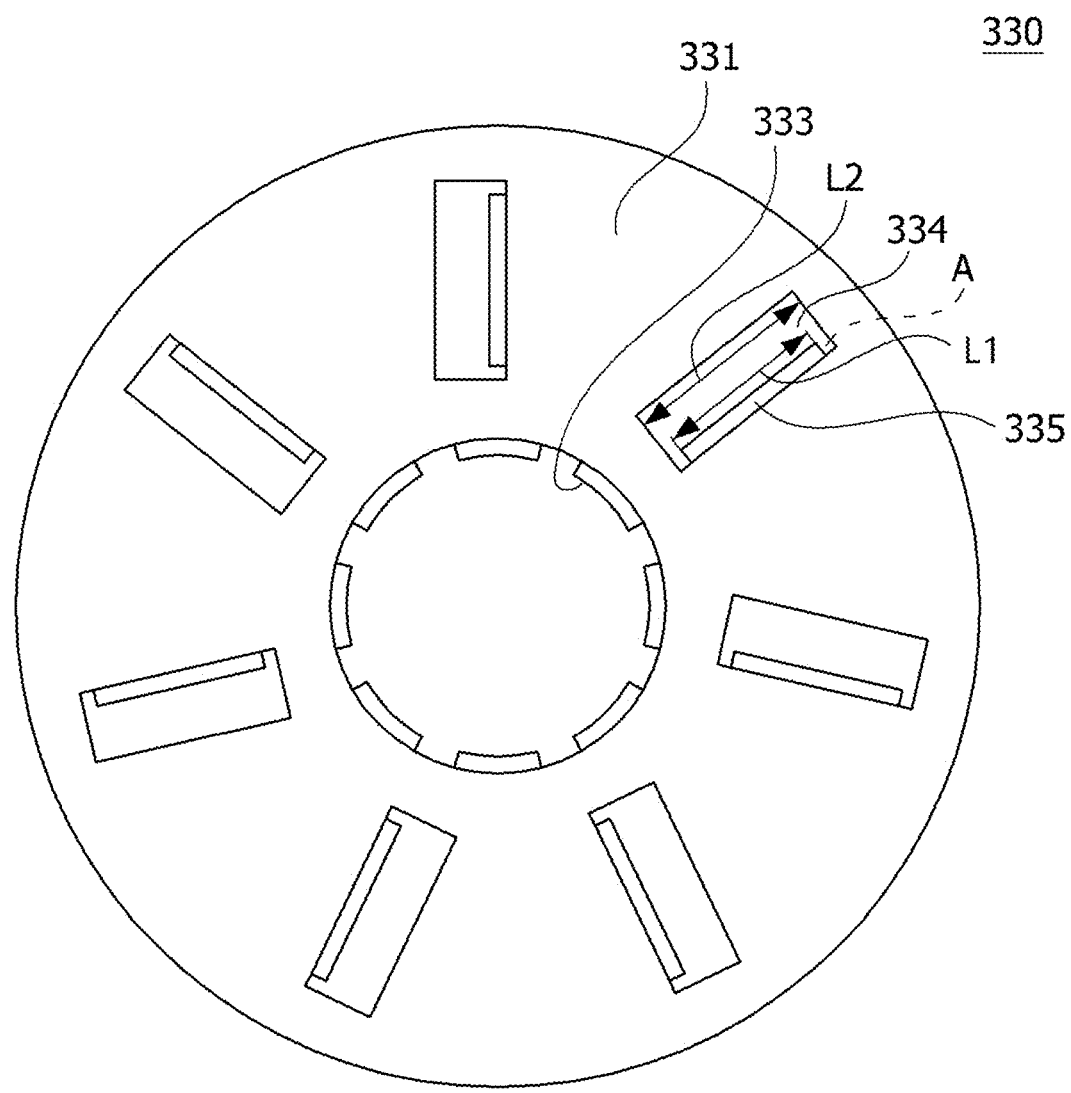
FIG. 13 is a bottom view of the plate shown in FIG. 8.

FIG. 13 is a bottom view of the plate shown in FIG. 8.

Referring to FIG. 13, a length L1 of the protruding portion 335 may be less than a length L4 of the through hole 334. Thus, a separation space such as "A" may be generated at a boundary between the protruding portion 335 and the through hole 334 in a longitudinal direction of the through hole 334.

Figure 14:
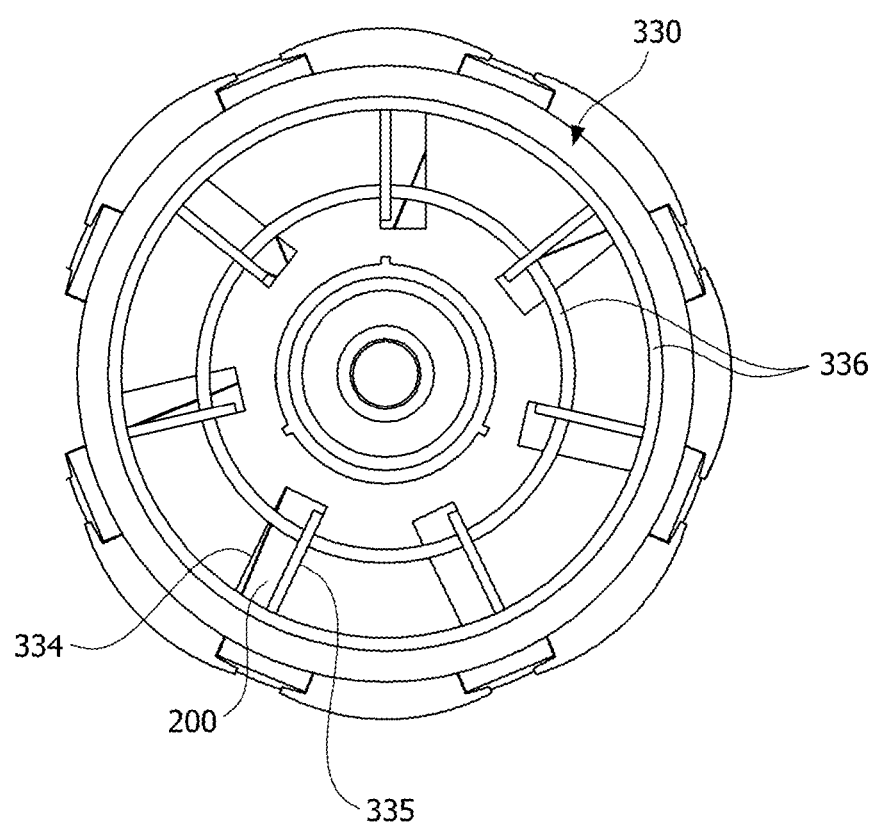
FIG. 14 is a bottom view of the rotor shown in FIG. 3.

FIG. 14 is a bottom view of the rotor shown in FIG. 3.

Referring to FIG. 14, sealants 336 may be applied to the lower surface of the plate 330. The sealants 336 may be arranged to form an annular shape in a circumferential direction of the plate 330. The sealants 336 may be arranged with a boundary between the protruding portion 335 and the protruding portion 335 therebetween. A plurality of sealants 336 may be disposed. The sealant 336 may be disposed across the through hole 334. The sealant 336 may be disposed to pass through a separation space such as "A" in FIG. 13 in which the protruding portion 335 is not formed. The sealant 336 may be continuously disposed to form an annular shape in the circumferential direction of the plate 330. The sealant 336 located in the through hole 334 is in contact with the magnet 200 and the lower surface of the rotor core 100 exposed through the through hole 334. Thus, together with the plate 330, the sealant 336 may further inhibit the magnet 200 from being separated from the pocket 131 toward the lower side of the rotor core 100.

Figure 15:
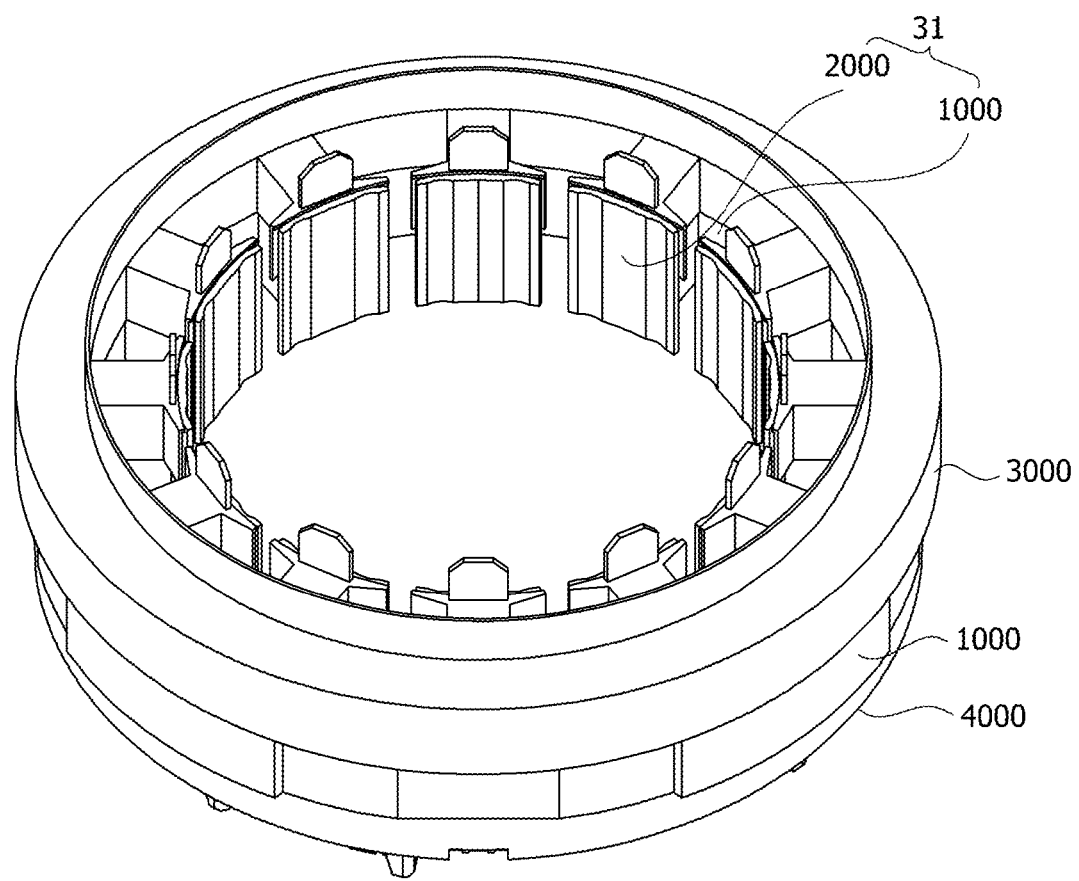
FIG. 15 is a view illustrating a stator shown in FIG. 1.
Figure 16:
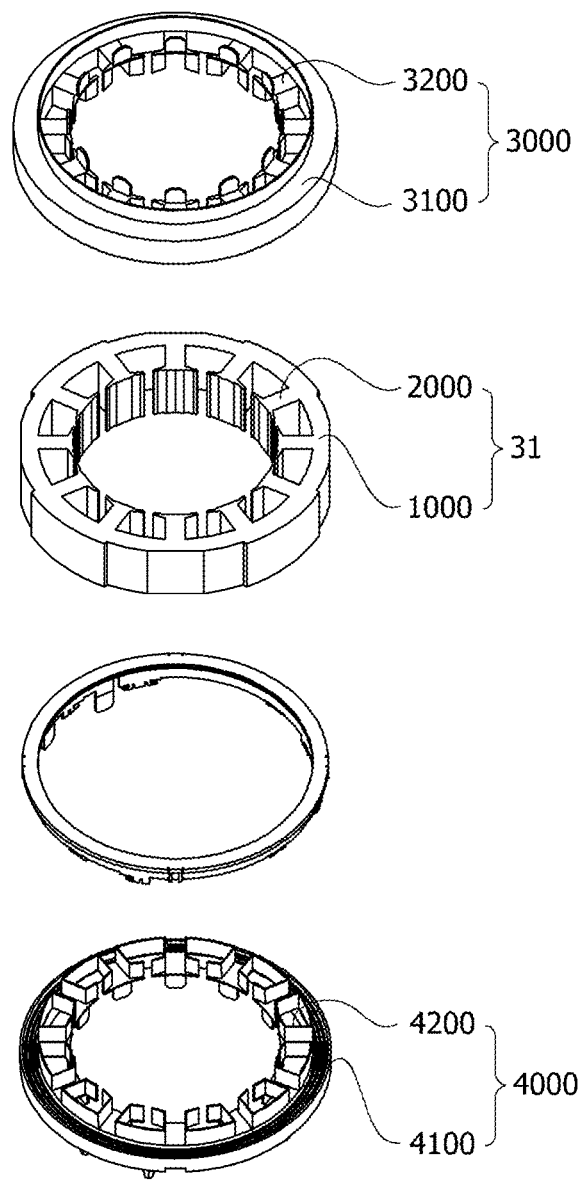
FIG. 16 is an exploded perspective view of the stator shown in FIG. 15.

FIG. 15 is a view illustrating the stator shown in FIG. 1, and FIG. 16 is an exploded perspective view of the stator shown in FIG. 15.

Referring to FIGS. 15 and 16, the stator core 31 includes a yoke 1000 having an annular shape and a plurality of teeth 2000 protruding from an inner circumferential surface of the yoke 1000. In addition, the insulator 40 is mounted on the stator core 31. The insulator 40 may include an upper insulator 3000 and a lower insulator 4000.

The upper insulator 3000 is mounted on an upper side of the stator core 31, and the lower insulator 4000 is mounted on a lower side of the stator core 31.

Figure 17:
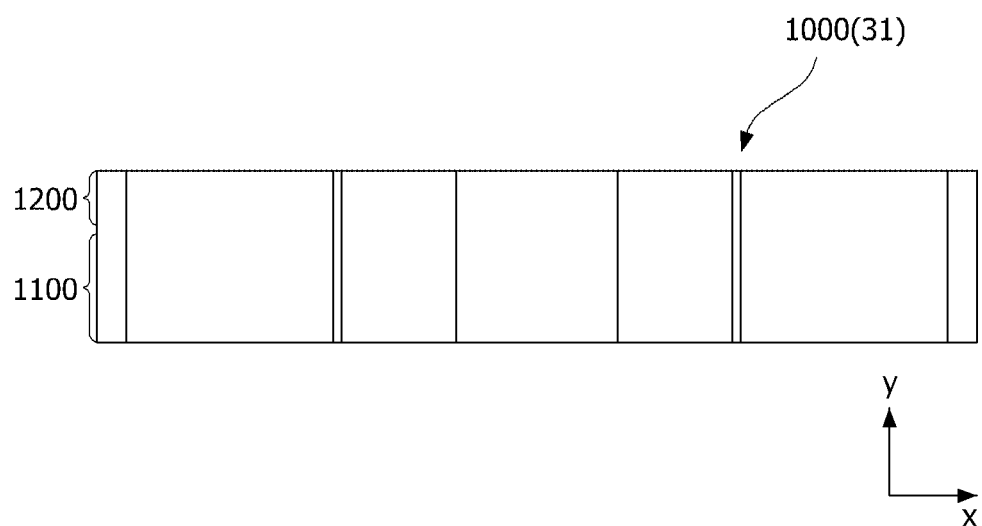
FIG. 17 is a side view of the stator shown in FIG. 15.

FIG. 17 is a side view of the stator shown in FIG. 15. The following descriptions will be made with reference to FIGS. 15 and 17.

The yoke 1000 may include a first region 1100 and a second region 1200 on an outer circumferential surface thereof. The first region 1100 and the second region 1200 are divided in a height direction (a y-axis direction in FIG. 17) of the yoke 1000. In FIG. 17, an x-axis direction is a radial direction of the stator 30. The second region 1100 is a region disposed outside the first cover 60. On the other hand, the first region 1100 is a region disposed inside the first cover 60. A step 61 in contact with a lower surface of the yoke 1000 may be disposed on an inner circumferential surface of the first cover 60.

The stator 30 is press-fitted into the first cover 60 through an open upper portion of the first cover 60. In this case, the first region 1100 is a region that is in contact with the inner circumferential surface of the first cover 60, and the second region 1200 is a region disposed above the first cover 60. As described above, only the lower side of the stator 30 is partially inserted into the first cover 60 and is fixed to the first cover 60. An upper side of the stator 30 is in an open state without a separate cover, and the lower side of the stator 30 is in a closed state due to the first cover 60. The motor according to the embodiment eliminates a housing structure in which both the upper side and the lower side of the stator 30 are covered, thereby simplifying components and lightening a product.

The upper insulator 3000 may include an upper body 3100 having an annular shape and a plurality of upper side coil winding parts 3200. The plurality of upper side coil winding parts 3200 may be formed to extend inwardly from the upper body 3100. Each of the plurality of upper side coil winding parts 3200 covers each of the plurality of teeth 2000.

Figure 18:
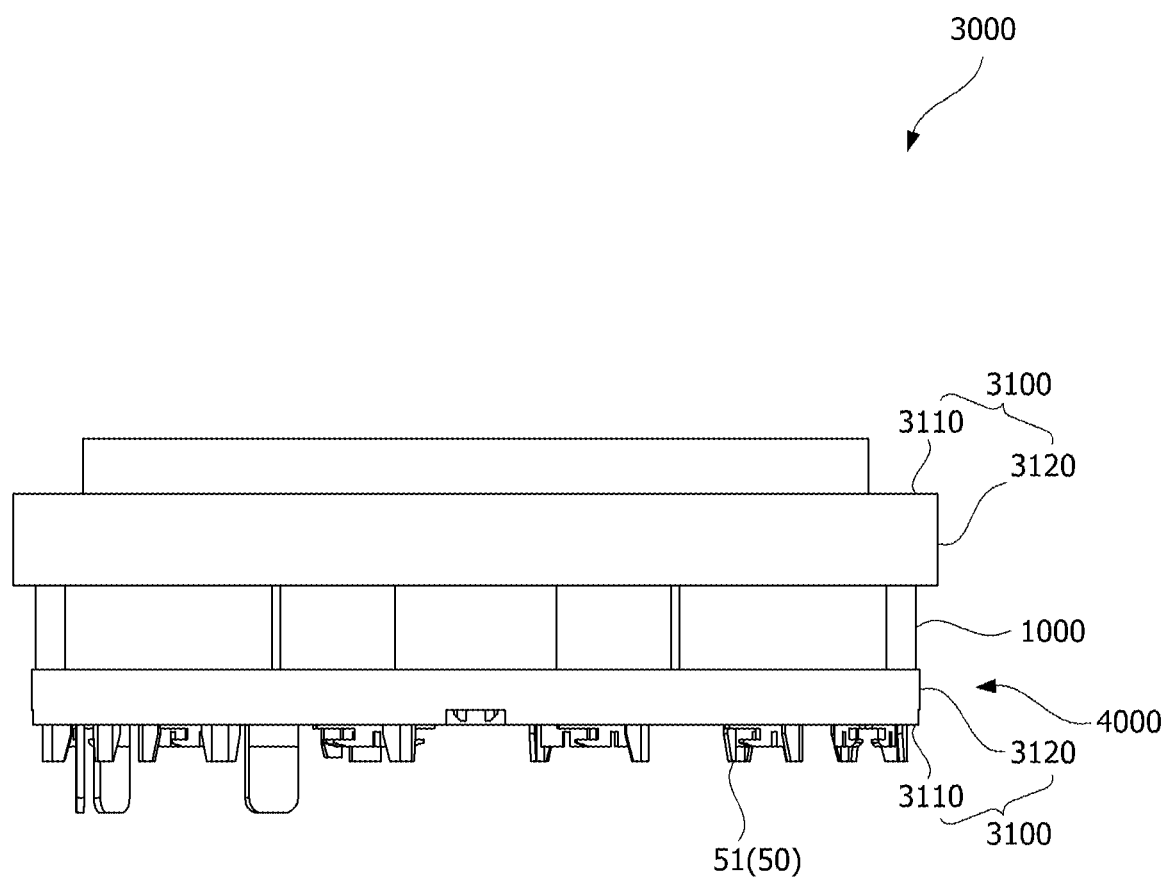
FIG. 18 is a side view of the stator shown in FIG. 15.

FIG. 18 is a side view of the stator shown in FIG. 15.

Referring to FIGS. 1, 17, and 18, the upper body 3100 may include an upper surface portion 3110 and a first outer side surface portion 3120. An inner circumferential surface of the first outer side surface portion 3120 is in contact with the second region 1200 to cover the second region 1200. When the stator 30 is press-fitted into the first cover 60, the second region 1200 is exposed to the outside unlike the first region 1100. The upper body 3100 is generally made of steel and thus has a risk of rust being generated thereon when moisture is in contact therewith. Thus, the first outer side surface portion 3120 protects the stator 30 by covering the exposed second region 1200.

The lower insulator 4000 may include a lower body 4100 having an annular shape and a plurality of lower side coil winding parts 4200. The plurality of lower side coil winding parts 4200 may be formed to extend inwardly from the lower body 4100. Each of the plurality of lower side coil winding parts 4200 covers each of the plurality of teeth 2000.

The lower body 4100 may include a lower surface portion 4110 and a second outer side surface portion 4120. An upper surface of the second outer side surface portion 4120 may be in contact with a lower surface of the stator core 31. When the stator 30 is press-fitted into the first cover 60, the lower insulator 4000 is located inside the first cover 60.

Figure 20:
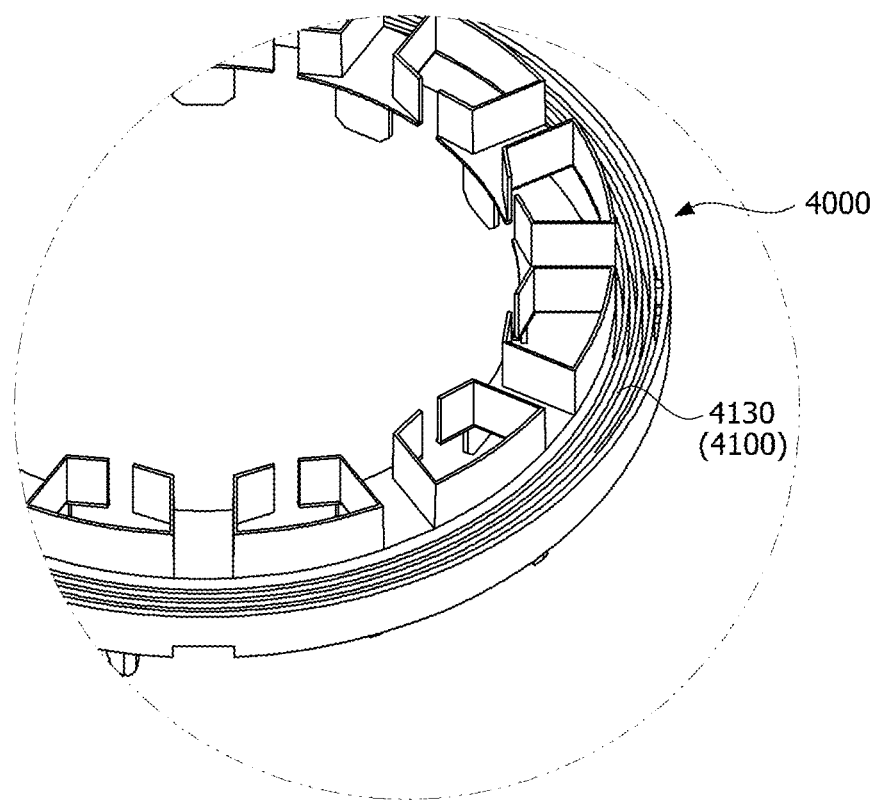
FIG. 20 is a view illustrating a terminal groove of a lower insulator shown in FIG. 16.

FIG. 20 is a view illustrating a terminal groove of the lower insulator shown in FIG. 16.

Referring to FIG. 20, the lower body 4100 may include a terminal groove 4130. The busbar terminal 50 (in FIGS. 1 and 2) may be accommodated in the terminal groove 4130. The terminal groove 4130 implements a space for accommodating the busbar terminal 50 (in FIGS. 1 and 2) through a structure having a plurality of partition walls. An upper portion of the lower body 4100 is open so that the busbar terminal 50 (in FIGS. 1 and 2) may be accommodated in the terminal groove 4130. Thus, a cover 4140 covering the terminal groove 4130 may be provided. The cover 4140 may be in the form of an annular-shaped plate. An upper surface of the cover 4140 may be in contact with an upper surface of the stator core 31.

Figure 19:
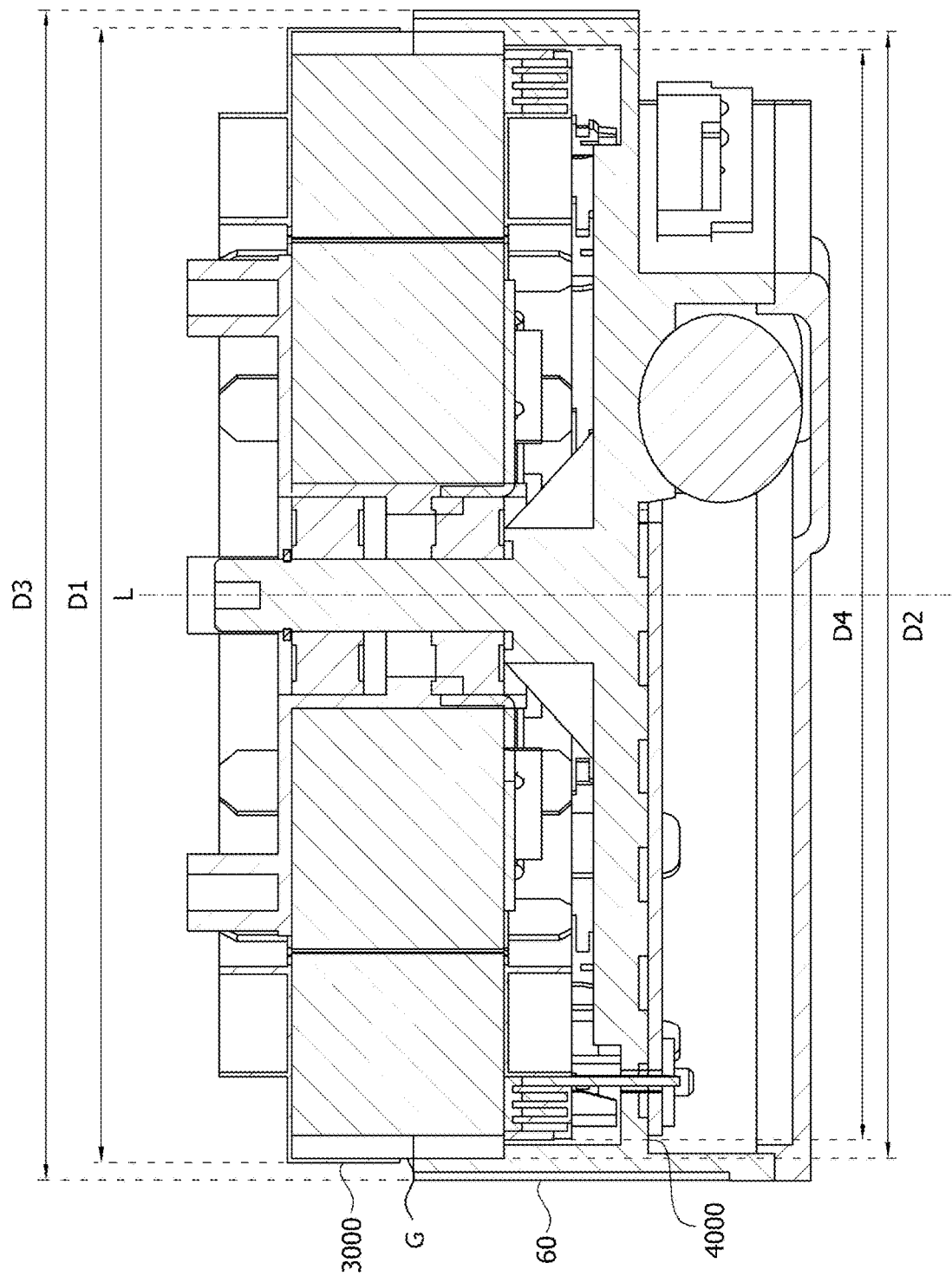
FIG. 19 is a view comparing a diameter of an insulator and a diameter of a first cover.

FIG. 19 is a view comparing a diameter of the insulator and a diameter of the first cover.

Referring to FIG. 19, an outer diameter D1 of the upper insulator 3000 may be greater than an inner diameter D2 of the first cover 60 and less than an outer diameter D3 of the first cover 60. In addition, an outer diameter D4 of the lower insulator 4000 may be less than the inner diameter D2 of the first cover 60.

Figure 21:
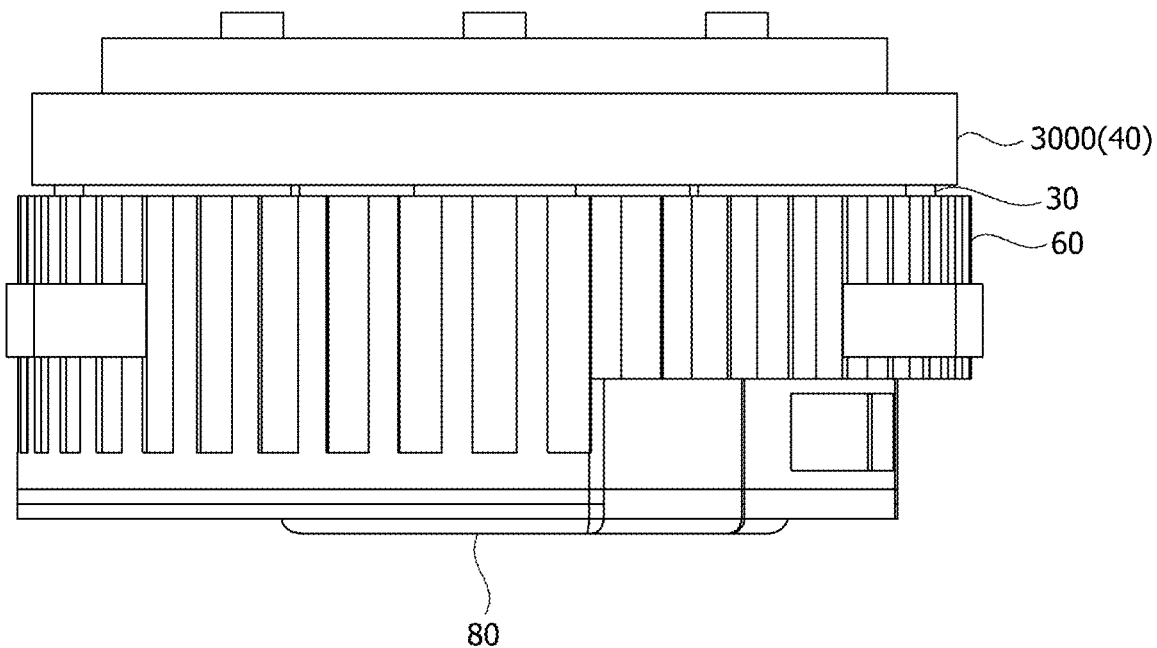
FIG. 21 is a side view of the motor shown in FIG. 1.

FIG. 21 is a side view of the motor shown in FIG. 1.

Referring to FIG. 21, in a state in which the stator 30 is press-fitted into the first cover 60, the upper insulator 3000 covers and protects the exposed portion of the stator 30. As shown in FIG. 19, a gap G may be formed between a lower end of the upper insulator 3000 and an upper end of the first cover 60.

Figure 22:
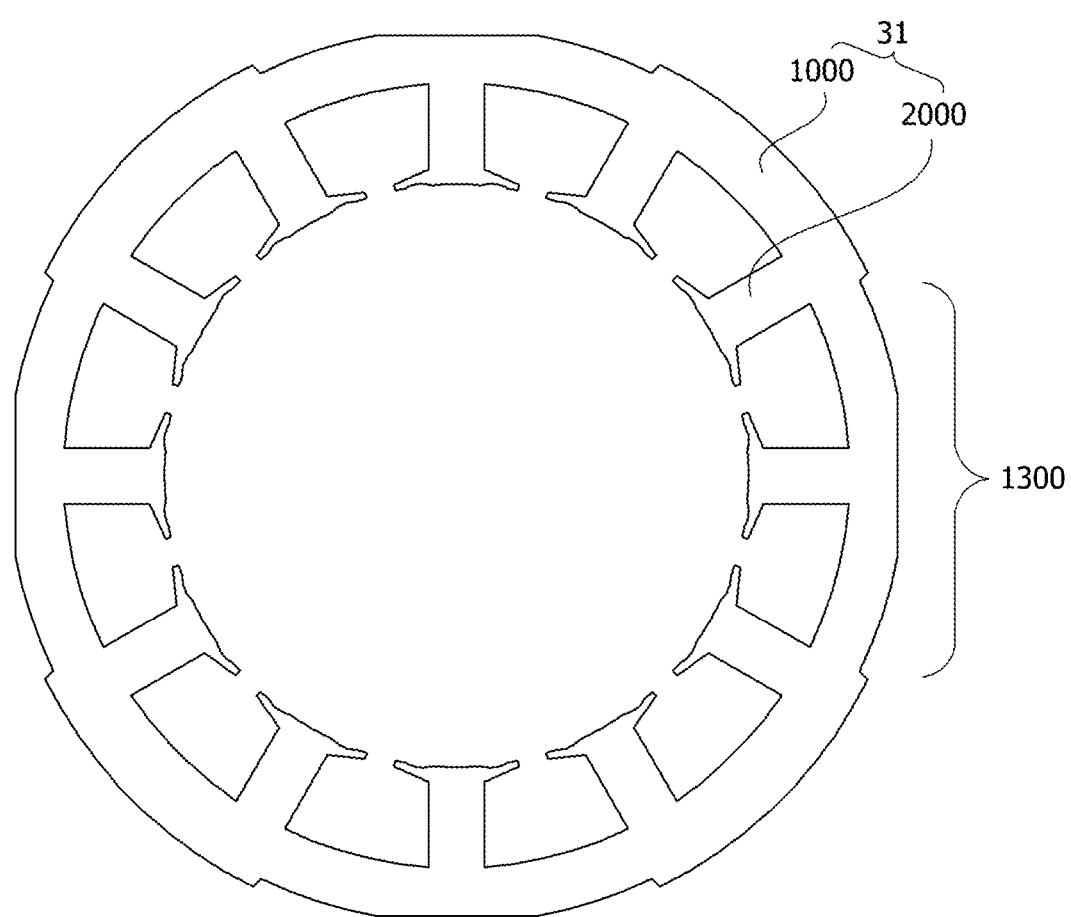
FIG. 22 is a plan view illustrating the stator.

FIG. 22 is a plan view illustrating the stator.

Referring to FIG. 22, it may include a groove portion 1300 that is concavely disposed on the outer circumferential surface of the yoke 1000 of the stator core 31. The groove portion 1300 may be disposed to be long from an upper end to a lower end of the yoke 1000. The groove portion 1300 is for easily adjusting a press-fitting force when the stator 30 is press-fitted into the first cover 60.

As described above, the motor according to one exemplary embodiment of the present invention has been specifically described with reference to the accompanying drawings. It should be noted that the above-described one embodiment of the present invention is merely an example in all aspects and is not intended to be limitative, and the scope of the present invention will be defined by the following claims rather than the above detailed description. In addition, it should be interpreted that the scope of the present invention encompasses all modifications and alterations derived from meanings, the scope, and equivalents of the appended claims.

The invention claimed is:

1. A motor comprising:
a shaft;
a rotor coupled to the shaft; and
a stator disposed outside the rotor, wherein the rotor includes:
a bearing holder including a cylinder portion and a flange portion;
a first bearing and a second bearing disposed in the cylinder portion;
a rotor core including a hole coupled to the cylinder portion; and
a plurality of magnets coupled to the rotor core, wherein the rotor core includes, a hub and a plurality of teeth extending radially outward from the hub and spaced apart from each other in a circumferential direction of the rotor core, wherein pocket portions are respectively formed in gaps between adjacent teeth of the plurality of teeth of the rotor core, wherein magnets of the plurality of magnets are respectively disposed in the pocket portions, wherein the flange portion is disposed on the rotor core and the magnet, wherein the cylinder portion includes a first region in which the first bearing is disposed and a second region in which the second bearing is disposed, wherein the first region and the second region of the cylinder portion are inserted into the hole of the rotor core;
wherein the upper insulator includes an upper body having an annular shape and a plurality of upper side coil winding parts extending inwardly from the upper body, wherein the upper body includes an upper surface portion and a first outer side surface portion extending downward from the upper surface portion, and wherein an inner circumferential surface of the first outer side surface portion is in contact with the second region.

2. The motor of claim 1, wherein the bearing holder includes a groove formed in the second region and a plate coupled to the groove and disposed on a lower surface of the rotor core.

3. The motor of claim 2, wherein the plate includes a protruding portion protruding downward and extending in a radial direction.

4. The motor of claim 3, wherein a lower surface of the plate includes a sealant disposed in a circumferential direction.

5. A motor comprising:
a shaft;
a rotor coupled to the shaft; and
a stator disposed outside the rotor, wherein the rotor includes:
a bearing holder including a cylinder portion and a flange portion;
a first bearing disposed on one side of the cylinder portion;
a second bearing disposed on an other side of the cylinder portion; a rotor core including a hole coupled to the cylinder portion;
a plurality of magnets coupled to the rotor core; and a plate disposed below the rotor core,
wherein the rotor core includes, a hub and a plurality of teeth extending radially outward from the hub and spaced apart from each other in a circumferential direction of the rotor core, wherein pocket portions are respectively formed in gaps between adjacent teeth of the plurality of teeth of the rotor core,
wherein magnets of the plurality of magnets are respectively disposed in the pocket portions, wherein the flange portion is disposed on the rotor core,
wherein the plate is coupled to the other side of the cylinder portion,
wherein the upper insulator includes an upper body having an annular shape and a plurality of upper side coil winding parts extending inwardly from the upper body,
wherein the upper body includes an upper surface portion and a first outer side surface portion extending downward from the upper surface portion, and wherein an inner circumferential surface of the first outer side surface portion is in contact with the second region.

6. A motor comprising:
a shaft;
a rotor coupled to the shaft;
a stator disposed outside the rotor; and
a first cover having a cylindrical shape and disposed outside the stator,
wherein the stator includes a stator core and an insulator is disposed on the stator core, wherein the insulator includes an upper insulator and a lower insulator, wherein an outer circumferential surface of the stator core includes a first region and a second region, wherein the first region is disposed to be in contact with an inner circumferential surface of the first cover, wherein the second region is disposed above the first cover, wherein the lower insulator is disposed inside the first cover, wherein an inner circumferential surface of the upper insulator is in contact with the second region, wherein the upper insulator includes an upper body having an annular shape and a plurality of upper side coil winding parts extending inwardly from the upper body, wherein the upper body includes an upper surface portion and a first outer side surface portion extending downward from the upper surface portion, and wherein an inner circumferential surface of the first outer side surface portion is in contact with the second region.

7. The motor of claim 6, wherein a step in contact with a lower surface of the stator is disposed on the inner circumferential surface of the first cover.

8. The motor of claim 6, wherein an outer diameter of the upper insulator is greater than an inner diameter of the first cover and less than an outer diameter of the first cover, and an outer diameter of the lower insulator is less than the inner diameter of the first cover.

9. A motor comprising:

a shaft;

a rotor coupled to the shaft;

a stator disposed outside the rotor; and a first cover having a cylindrical shape and disposed outside the stator, wherein the stator includes a stator core and an insulator is disposed on the stator core, wherein the insulator includes an upper insulator and a lower insulator, wherein an outer circumferential surface of the stator core includes a first region and a second region, wherein the first region is disposed to be in contact with an inner circumferential surface of the first cover, wherein the second region is disposed above the first cover, wherein the lower insulator is disposed inside the first cover, wherein an inner circumferential surface of the upper insulator is in contact with the second region, wherein the upper insulator includes an upper body having an annular shape and a plurality of upper side coil winding parts extending inwardly from the upper body, wherein the upper body includes an upper surface portion and a first outer side surface portion extending downward from the upper surface portion, and wherein an inner circumferential surface of the first outer side surface portion is in contact with the second region.

10. The motor of claim 9, wherein a step in contact with a lower surface of the stator is disposed on the inner circumferential surface of the first cover.

11. The motor of claim 9, wherein an outer diameter of the upper insulator is greater than an inner diameter of the first cover and less than an outer diameter of the first cover, and wherein an outer diameter of the lower insulator is less than the inner diameter of the first cover.

* * * * *